US008708498B2

(12) United States Patent
Sasaki et al.

(10) Patent No.: US 8,708,498 B2
(45) Date of Patent: Apr. 29, 2014

(54) DISPLAY APPARATUS FOR VEHICLE AND DISPLAY METHOD

(75) Inventors: Takashi Sasaki, Kanagawa-ken (JP);
Aira Hotta, Kanagawa-ken (JP);
Haruhiko Okumura, Kanagawa-ken (JP)

(73) Assignee: Kabushiki Kaisha Toshiba, Toyko (JP)

(*) Notice: Subject to any disclaimer, the term of this patent is extended or adjusted under 35 U.S.C. 154(b) by 1047 days.

(21) Appl. No.: 12/561,450

(22) Filed: Sep. 17, 2009

(65) Prior Publication Data
US 2010/0073636 A1 Mar. 25, 2010

(30) Foreign Application Priority Data
Sep. 19, 2008 (JP) ................. 2008-241223

(51) Int. Cl.
G03B 21/00 (2006.01)

(52) U.S. Cl.
USPC ............................................. 353/13

(58) Field of Classification Search
USPC ................... 353/11–14, 28; 359/630–633
See application file for complete search history.

(56) References Cited

U.S. PATENT DOCUMENTS

| 2009/0135374 A1 | 5/2009 | Horiuchi et al. |
| 2009/0153962 A1 | 6/2009 | Okada et al. |
| 2009/0201225 A1 | 8/2009 | Okada et al. |
| 2009/0237803 A1 | 9/2009 | Hotta et al. |
| 2009/0243963 A1 | 10/2009 | Hotta et al. |
| 2009/0244702 A1 | 10/2009 | Okada et al. |
| 2010/0066832 A1 | 3/2010 | Nagahara et al. |
| 2010/0066925 A1 | 3/2010 | Nagahara et al. |
| 2010/0067118 A1* | 3/2010 | Takahashi et al. ............ 359/633 |
| 2010/0073773 A1 | 3/2010 | Hotta et al. |
| 2011/0001639 A1 | 1/2011 | Sasaki et al. |

FOREIGN PATENT DOCUMENTS

| JP | 2004-322680 | 11/2004 |
| JP | 2005-247224 | 9/2005 |
| JP | 2005247224 A * | 9/2005 |
| JP | 2006-017626 | 1/2006 |
| WO | 2009/066408 | 5/2009 |

OTHER PUBLICATIONS

Japanese Office Action mailed Aug. 27, 2010 for Japanese Patent Application No. 2008-241223.
Shojiro, Nagata. Visual Sensitivities to Cue for Depth Perception, The Journal of the Institute of Image Information and Television Engineers, vol. 31, No. 8, pp. 649-655, 1977.

* cited by examiner

Primary Examiner — Thanh Luu
Assistant Examiner — Danell L Owens
(74) Attorney, Agent, or Firm — Amin, Turocy & Watson, LLP

(57) ABSTRACT

A display apparatus for vehicle includes: an image projector configured to project a light flux including an image having a display object toward a one eye of an image viewer; and a position detector configured to detect the one eye of the image viewer. The image projector changes at least one of a position, a shape and a size of the display object in the image on the basis of a position of the one eye detected by the position detector.

17 Claims, 14 Drawing Sheets

DISPLAY APPARATUS FOR VEHICLE AND DISPLAY METHOD

CROSS-REFERENCE TO RELATED APPLICATIONS

This application is based upon and claims the benefit of priority from the prior Japanese Patent Application No. 2008-241223, filed on Sep. 19, 2008; the entire contents of which are incorporated herein by reference.

BACKGROUND OF THE INVENTION

1. Field of the Invention

This invention relates to a display apparatus for vehicle and a display method.

2. Background Art

There is a group of display devices called as Head-Up Display (HUD) as a display apparatus for vehicle. In these display apparatuses, an image presented by picture formation devices such as LCD (Liquid Crystal Display) or CRT (Cathode Ray Tube) is supplied to an observer driving a vehicle by reflecting the image on a half-translucent reflector such as a half-mirror through an optical system. By the half-translucent reflector, which is called as a combiner, the transmitted outside information and the reflected picture of the picture formation device are superimposed and supplied to the observer. As a result, the observer is allowed to visually identify the outside information and the picture information of the picture formation device simultaneously.

With respect to the display apparatus like this, it is strongly requested that the outside information defining the background is completely superimposed upon the presented picture information, for example, the presented picture information is placed to be projected at a position corresponding to spatial location of the outside information. Particularly, it is tried that route information is presented in a state of more matching with the outside information defining the background.

JP-A 2006-17626 discloses a technology presenting an image while changing the image size along a lapse of time with movement of a moving object so that the image is overlapped with a scene to be seen ahead a windscreen of the moving object.

However, in the conventional HUD, a subjective depth position (depth perception position) of the presented information coincides with a virtual image position observed as a virtual image, therefore, even if any presented information is given, it is difficult to coincide the depth perception position of the presented information with the real spatial location.

Distance characteristics of depth sensitivity due to various causes with respect to human depth sensitivity are reported in "Shojiro, Nagata; "Visual Sensitivities to Cue for Depth Perception", The Journal of the Institute of Image Information and Television Engineers, vol. 31, No. 8, pp. 649-655, 1977 (in Japanese), hereinafter referred to as Non-Patent Document 1.

SUMMARY OF THE INVENTION

According to an aspect of the invention, there is provided a display apparatus for vehicle comprising: an image projector configured to project a light flux including an image having a display object toward an one eye of an image viewer; and a position detector configured to detect the one eye of the image viewer, the image projector changing at least one of a position, a shape and a size of the display object in the image on the basis of a position of the one eye detected by the position detector.

According to another aspect of the invention, there is provided a display method comprising: detecting a position of an one eye of an image viewer; and changing at least one of a position, a shape and a size of a display object in an image on the basis of the position of the one eye detected and projecting a light flux including the image toward the one eye of the image viewer.

DETAILED DESCRIPTION

Figure 1:
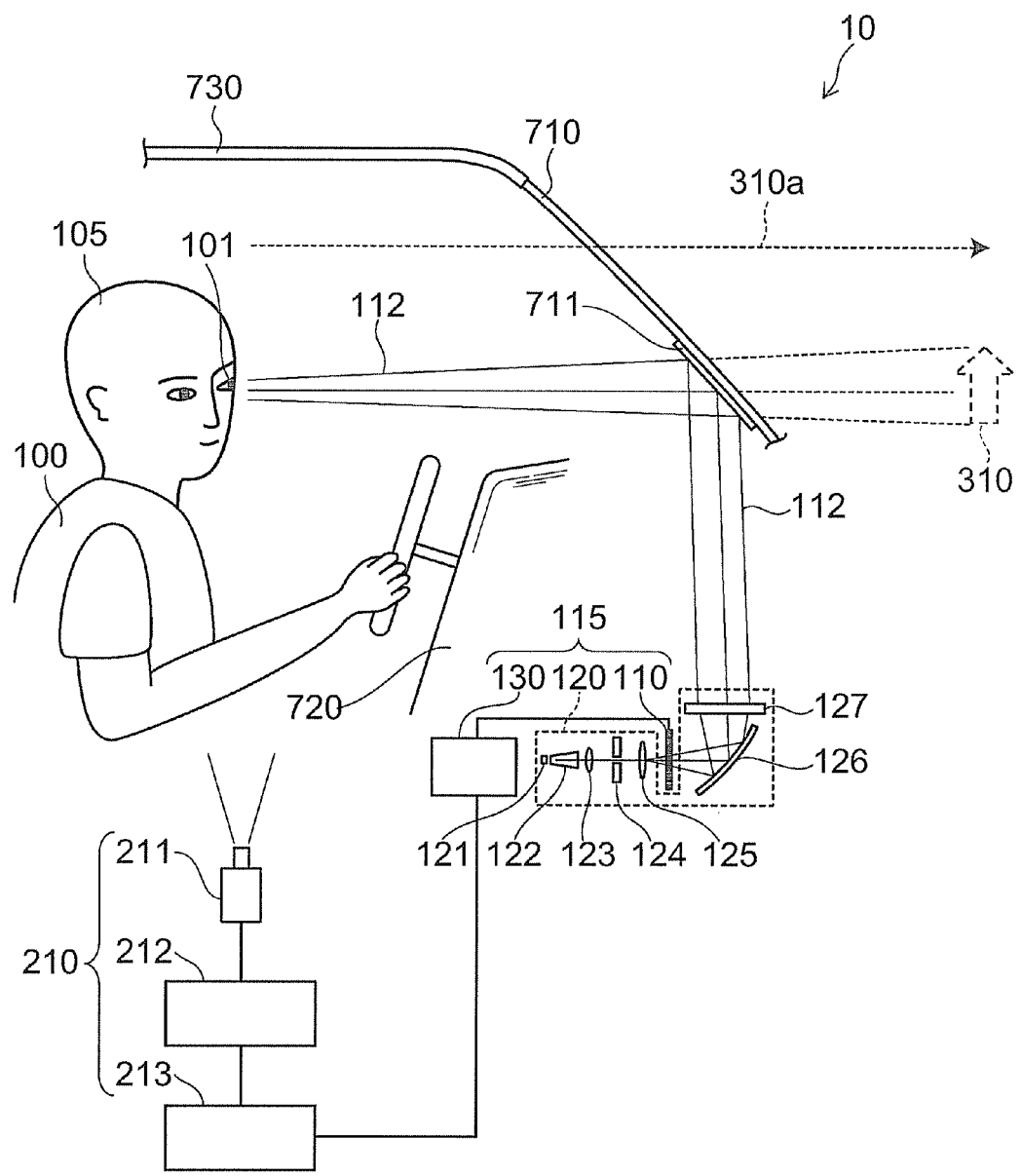
FIG. 1 is a schematic view illustrating the configuration of a display apparatus for vehicle according to a first embodiment of the invention.

Embodiments of the invention will now be described in detail with reference to the drawings. In the present specification and drawings, the same elements as those described previously with reference to earlier figures are labeled with like reference numerals, and the detailed description thereof is omitted as appropriate. Here, up and down, right and left, and fore and aft in the illustration are relative with reference to the description in drawings.

First Embodiment

FIG. 1 is a schematic view illustrating the configuration of a display apparatus for vehicle according to a first embodiment of the invention.

As shown in FIG. 1, the display apparatus for vehicle 10 according to the first embodiment of the invention includes an image projector 115 configured to project a light flux 112 for projecting an image containing a display object toward one eye 101 of an image viewer 100, and a position detector 210 configured to detect the one eye 101 of the image viewer 100. Thus, the light flux 112 includes the image having a display object.

The display object is provided in the image presented by the display apparatus for vehicle 10 to the image viewer 100, and for example, is a display content such as an arrow representing traveling direction, speed, attention, or warning, with regard to driving information of a moving object 730 on which the display apparatus for vehicle 10 is mounted.

As illustrated in the figure, the display apparatus for vehicle 10 is provided in a moving object 730, for example, such as a vehicle or the like, namely, for example, in the back side of a dashboard 720 of the moving object 730 as viewed from the image viewer 100 being a driver.

An image projector 115 includes, for example, an image generating section 130, an image forming section 110 and a projector 120.

The image generating section 130 generates an image signal corresponding to the image including the display object to supply to the image forming section 110.

As the image forming section 110, various optical switches such as LCD, DMD (Digital Micromirror Device) or MEMS (Micro-electro-mechanical System) can be used, for example. The image signal including the prescribed image is supplied to the image forming section 110 from the image generating section 130 and the image is formed on a screen of the image forming section 110.

On the other hand, the projector 120 is illustratively based on light sources, a projection lens, a mirror and various optical devices for controlling divergence angle (diffusion angle).

In the specific example, the projector 120 is illustratively based on a light source 121, a tapered light guide 122, a first lens 123, a variable aperture 124, a second lens 125, a mobile mirror 126 illustratively having a concave configuration, and a non-spherical Fresnel lens 127.

For example, when a focal length of the first lens 123 is f1, and a focal length of the second lens 125 is f2, the variable aperture 124 is placed at the distance of f1 from the first lens 123 and f2 from the second lens 125.

A light flux outgoing from the second lens 125 is incident on the image forming section 110 to be the light flux 112 modulated based on the formed image.

The light flux 112 passes through the mirror 126 and the non-spherical Fresnel lens 127, and is reflected by a reflector 711 provided on a windscreen 710 (transparent plate) of the moving object 730 on which the display apparatus for vehicle 10 is mounted to be projected on the one eye 101 of the image viewer 100. The image viewer 100 perceives a virtual image 310 formed at a virtual image formation position 310a through the reflector 711. Thus, the display apparatus for vehicle 10 can be used as HUD.

Here, the light source 121 can be based on various ones such as LED (Light Emitting Diode), a high-pressure mercury lamp, a halogen lamp and laser or the like. The non-spherical Fresnel lens 127 can be designed so as to be able to control a shape (cross-sectional shape or the like) of the light flux 112 in accordance with a shape of the windscreen 710.

Here, the image projector 115 has various possible variations other than the above specific example.

On the other hand, the position detector 210 detects the one eye 101 of the image viewer 100, on which the image is projected. The position detector 210 can include, for example, an image taking section 211 configured to take an image of the image viewer 100, an image processing section 212 configured to process the imaged picture taken by the image taking section 211, and a calculating section 213 configured to evaluate and detect the position of the one eye 101 of the image viewer 100 on the basis of the data subjected to image processing by the image processing section 212.

In the calculating section 213, for example, by using a technique for person authentication described in JP 3279913 and so forth, the face of the image viewer 100 is recognized and positions of eyeballs as face parts of the image viewer 100 are calculated and the position of the one eye 101 on which the image of the image viewer 100 should be projected is evaluated and detected.

The image taking section 211 is disposed, for example, in front of or laterally to the driver seat of the moving object 730, and, for example, takes an image of the face of the image viewer 100 that is the driver, and detects the position of the one eye 101 of the image viewer as described above.

In the display apparatus for vehicle 10 according to this embodiment, the image projector 115 changes at least one of a position, a shape and a size of the display object in the image on the basis of the position of the one eye 101 detected by the position detector 210.

That is, the output of the position detector 210, namely, data on the position of the one eye detected is supplied to the image generating section 130 and the image generating section 130 generates the image signal having at least one of the position, the shape and the size of the display object in the image changed. The image signal is supplied to the image forming section 110 and the image having at least one of the position, the shape and the size of the display object in the image changed is projected on the one eye 101 of the image viewer 100.

Figure 2A:
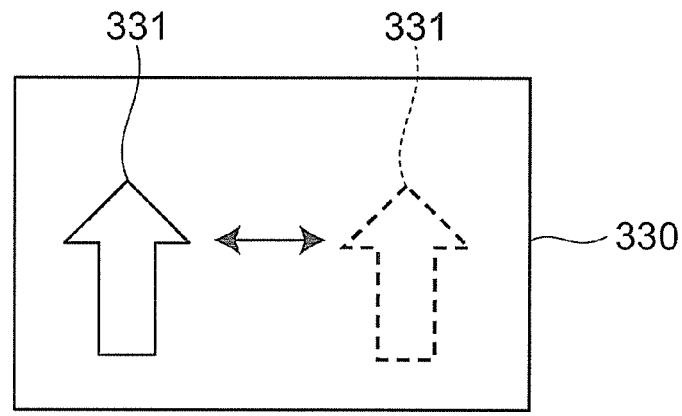
FIGS. 2A to 2C are schematic views illustrating images of the display apparatus for vehicle according to the first embodiment of the invention.
Figure 2B:
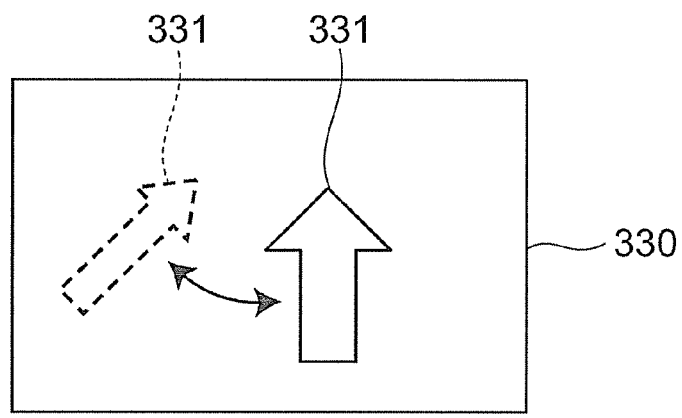
Figure 2C:
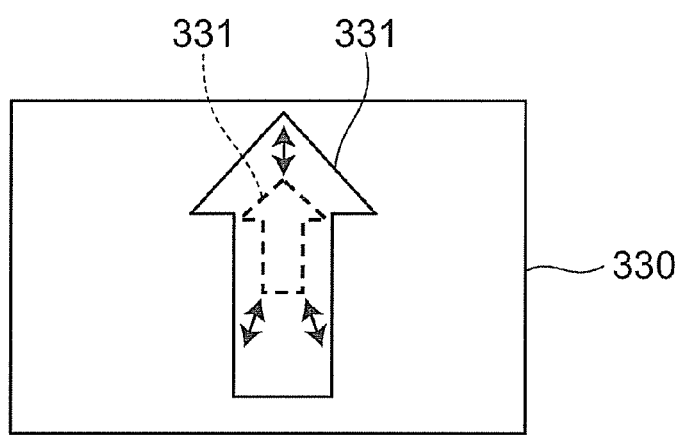

FIGS. 2A to 2C are schematic views illustrating images of the display apparatus for vehicle according to the first embodiment of the invention.

That is, the figure shows schematically examples of the image and display object which are formed by the display apparatus for vehicle 10 according to this embodiment.

As shown in FIG. 2A, in the display apparatus for vehicle 10, the image 330 includes the display object 331. The image 330 is, for example, a picture displayed on the screen of various display apparatuses and for example, a rectangular region. An optional picture may be displayed in the rectangular region of the image 330 aside from the display object described below.

On the other hand, the display object 331 is included in the image 330, and has a schematic shape representing an arrow in the specific example. However, the invention is not limited thereto, but the display object 331 may have an optional shape and, for example, may be display content such as various graphics, velocity, caution and warning in accordance with the content in the image 330.

As shown in FIG. 2A, in the display apparatus for vehicle 10 according to this embodiment, the position of the display object 331 in the image 330 can be changed on the basis of the position of the one eye 101 detected.

As shown in FIG. 2B, in the display apparatus for vehicle 10 according to this embodiment, the shape of the display object 331 in the image 330 can be changed on the basis of the position of the one eye 101 detected. The shape, for example, includes an aspect ratio of the display object 331 and an angle of arrangement or the like in the image 330.

Furthermore, as shown in FIG. 2C, in the display apparatus 10 according to this embodiment, the size of the display object 331 in the image 330 can be changed on the basis of the position of the one eye 101 detected.

These specific examples illustrate the position, the shape and the size of the display object 331 in the image 330 individually, however, can change at least one of the above, furthermore, may change two or more of the position, the shape and the size simultaneously.

Thereby, the display apparatus for vehicle 10 according to this embodiment can provide a display apparatus for vehicle capable of placing a depth perception position of the presented information stably at an optional position.

That is, at least one of the position, the shape and the size of the above display object 331 in the image 330 can be changed on the basis of moving subject parallax described below.

Figure 3:
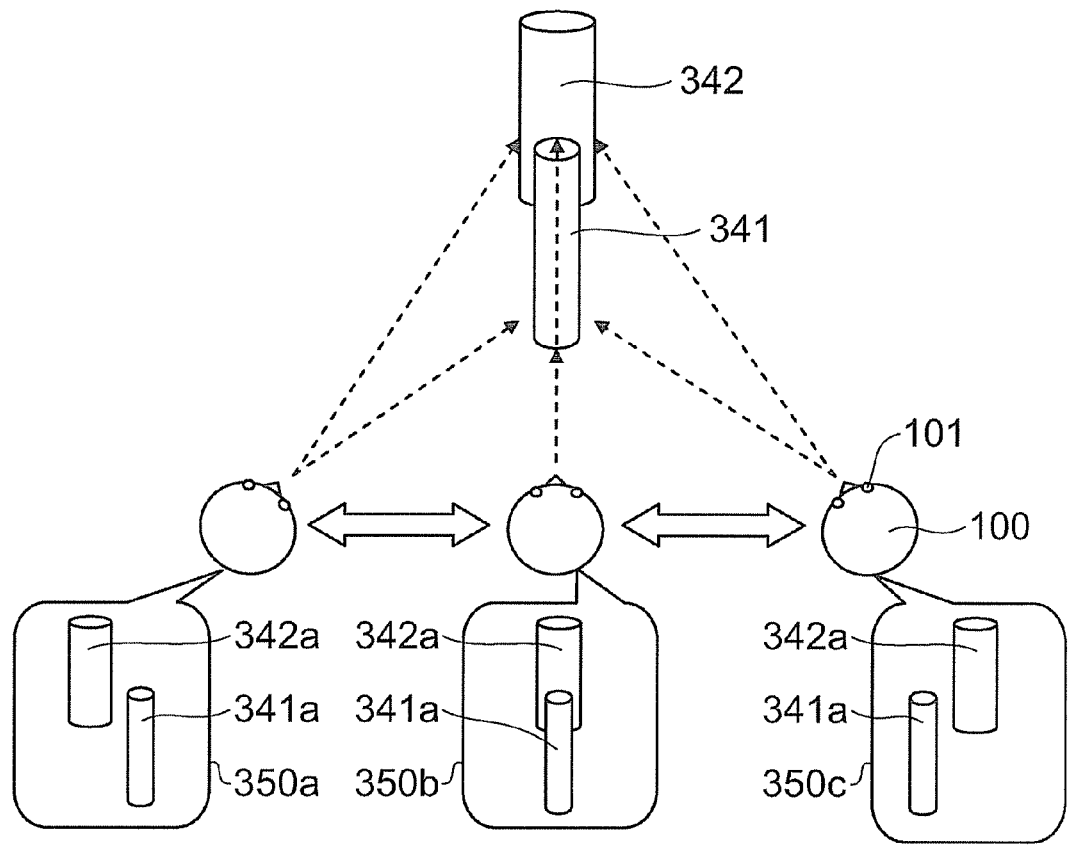
FIG. 3 is a schematic view illustrating the operation of the display apparatus for vehicle according to the first embodiment of the invention.

FIG. 3 is a schematic view illustrating the operation of the display apparatus for vehicle according to the first embodiment of the invention.

That is, the figure illustrates an aspect when the image viewer 100 views two objects, namely, a first object 341 near to the image viewer 100 and a second object 342 far from the image viewer 100.

As shown in FIG. 3, when the image viewer 100 views the first and second objects 341, 342 from the left side, an image 341a of the first object 341 is placed at the right side of an image 342a of the second object 342 in an image 350a viewed by the image viewer 100.

When the image viewer 100 views the first and second objects 341 and 342 from the right side, the image 341a of the first object 341 is placed at the left side of the image 342a of the second object 342 in an image 350c viewed by the image viewer 100.

When the image viewer 100 views the first and second objects from the front, the image 341a of the first object 341 is overlapped with the image 342a of the second object 342.

As described above, when the image viewer 100 moves in a positional relation between the image viewer 100 and the object, the appearance of the object changes. That is, head movement of the image viewer generates movement parallax. At this time, the positional relation about the depth of the first object 341 and the second object 342 placed front and back with respect to the image viewer 100 becomes possible to be recognized on the basis of the movement parallax.

Thereby, the display device for vehicle 10 according to this embodiment can provide a display apparatus for vehicle capable of placing the depth perception position of the presented information stably at an optional position.

Figure 4:
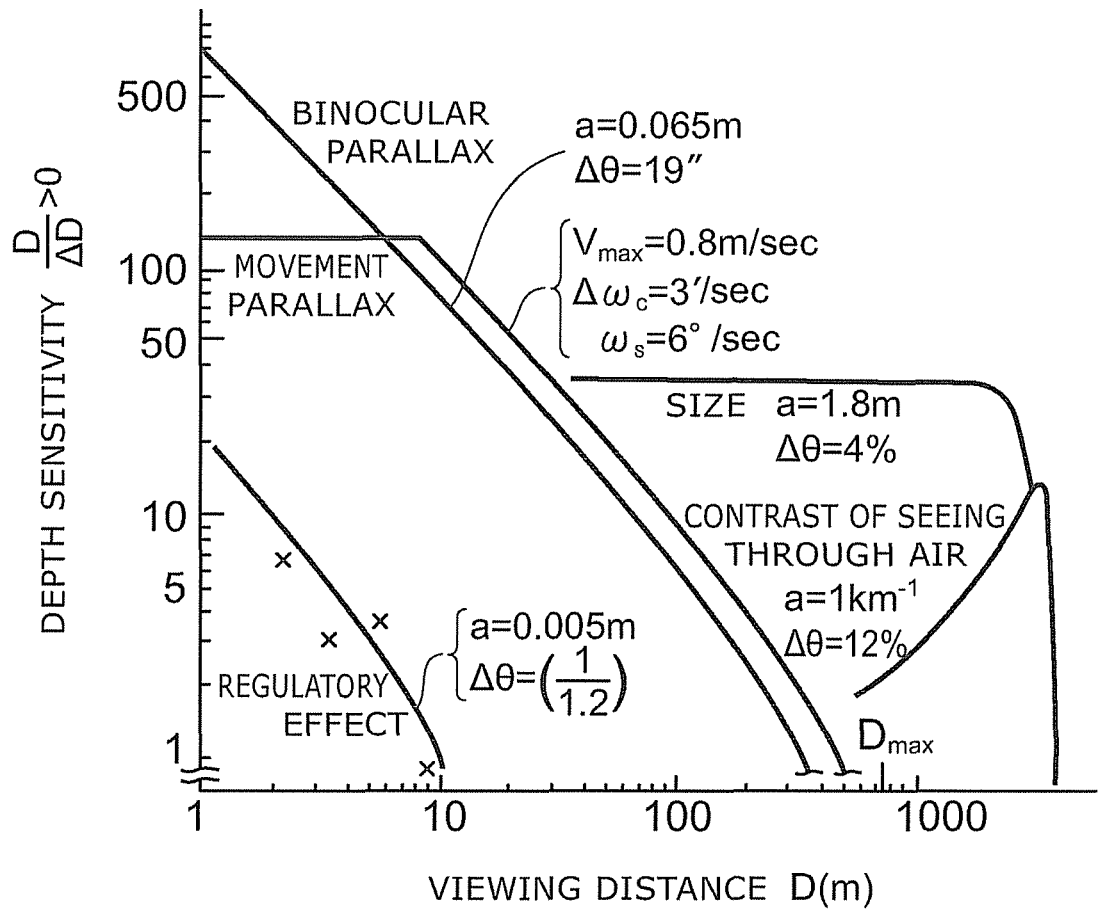
FIG. 4 is a schematic view illustrating characteristics on human depth sensitivity.

FIG. 4 is a schematic view illustrating characteristics on human depth sensitivity.

That is, the figure shows distance characteristics of the depth sensitivity due to various factors described in the Non-Patent Document 1.

Generally, it is considered that there are binocular parallax, moving subject parallax, and perspective factor as a cause (depth perception cue) inducing human depth perception.

As shown in FIG. 4, as a general, change of a visual point position changes positions at which the objects placed at different depth positions are seen and appearances of respective objects. This is the moving subject parallax (movement parallax based on the head movement of the image viewer). It is known that the effect of the moving subject parallax given by the depth perception has tendency which is shown in the figure with respect to other depth cues.

That is, the binocular parallax has the highest sensitivity to the depth perception within a range of approximately 5 meters from the image viewer, and the moving subject parallax has the high sensitivity over the range.

The moving subject parallax has the highest sensitivity within a range of approximately a few tens meters from the image viewer, and in a range farther than this range, so called perspective perception such as a size and contrast of seeing through air is predominant.

The display apparatus for vehicle 10 according to this embodiment allows the depth perception position of the presented information to be stably placed at an optional position by changing at least one of the position, the shape and the size of the display object 331 in the image 330 on the basis of characteristics of the moving subject parallax and the size.

Figure 5:
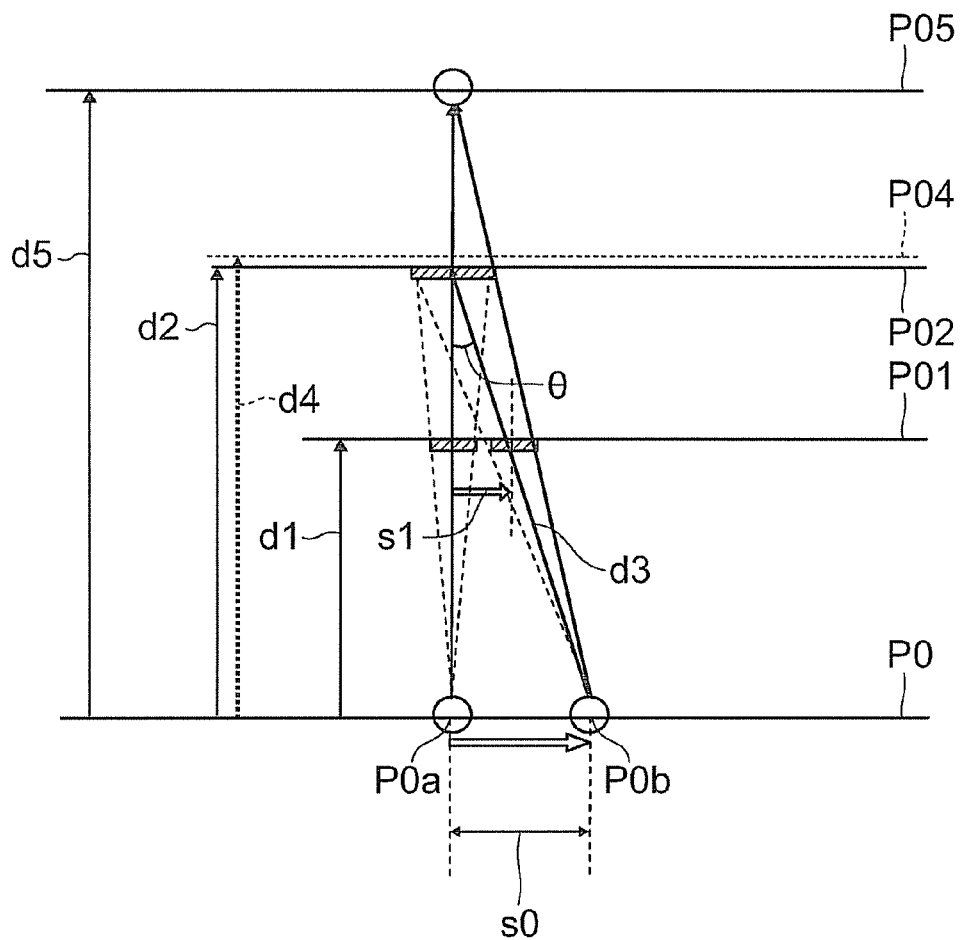
FIG. 5 is a schematic view illustrating the operation of the display apparatus for vehicle according to the first embodiment of the invention.

FIG. 5 is a schematic view illustrating the operation of the display apparatus for vehicle according to the first embodiment of the invention.

As shown in FIG. 5, for example, a distance from a viewing position P0 to a fixed imaged point P05 is assumed to be a fixed imaged point distance d5, and a distance from the viewing position P0 to a virtual image position P01 is assumed to be a virtual image distance d1. The virtual image distance d1 corresponds to a distance between the virtual image 310 (virtual image formation position 310a) and the one eye 101 of the image viewer 100 illustrated in FIG. 1.

A distance from the viewing position P0 to a depth presenting target position P02 of the image is assumed to be a distance d2. This depth presenting target position P02 is the depth position serving as a target of the presented information, and the depth position is desirably perceived to the image viewer 100 by the display apparatus for vehicle 10. This depth presenting target position P02 can be optionally defined on the basis of use condition of the display apparatus for vehicle 10. For example, it may be placed at a position far from the image viewer 100, or near, and may be continuously changed in accordance with outside information.

Then, a distance from an initial visual point position P0a to a visual point position P0b after movement of the head of the image viewer 100 at the viewing position P0 of the image viewer 100 is assumed to be a visual point moving distance s0.

At this time, in the display apparatus for vehicle 10 according to this embodiment, a virtual image moving distance s1 is set so as to satisfy equation (1).

$$s1 = s0(1 - d1/d2) \quad (1)$$

A position of the display object in the image is moved by the distance of this virtual image moving distance Si.

That is, in the display apparatus for vehicle 10 according to this embodiment, when the distance from the image viewer 100 to the virtual image position of the image formed by the reflector 711 is assumed to be d1, the distance from the image viewer 100 to the depth presenting target position P02 of the image is assumed to be d2, and a movement distance of the detecting position of the one eye detected is assumed to be s0, the image projector 115 moves the position of the display object in the image by the distance of the virtual image moving distance s1 satisfying the equation (1).

Thereby, a subjective depth position (depth perception position) P04 can be placed at the depth presenting target position P02 of the image. That is, a subjective depth distance d4 corresponding to the visual point moving distance s0 can be coincided with the distance d2 to the depth presenting target position P02 of the image.

Outside image (for example, image such as road sign) of the moving object 730 is placed at the fixed imaged point distance d5. However, it becomes possible that satisfaction of the above condition allows the outside information to be perceived to the image viewer 100 as if the subjective depth position P04 is placed at an optional position (optional depth presenting target position P02) without dependence on the fixed imaged point distance d5 like this.

Figure 6:
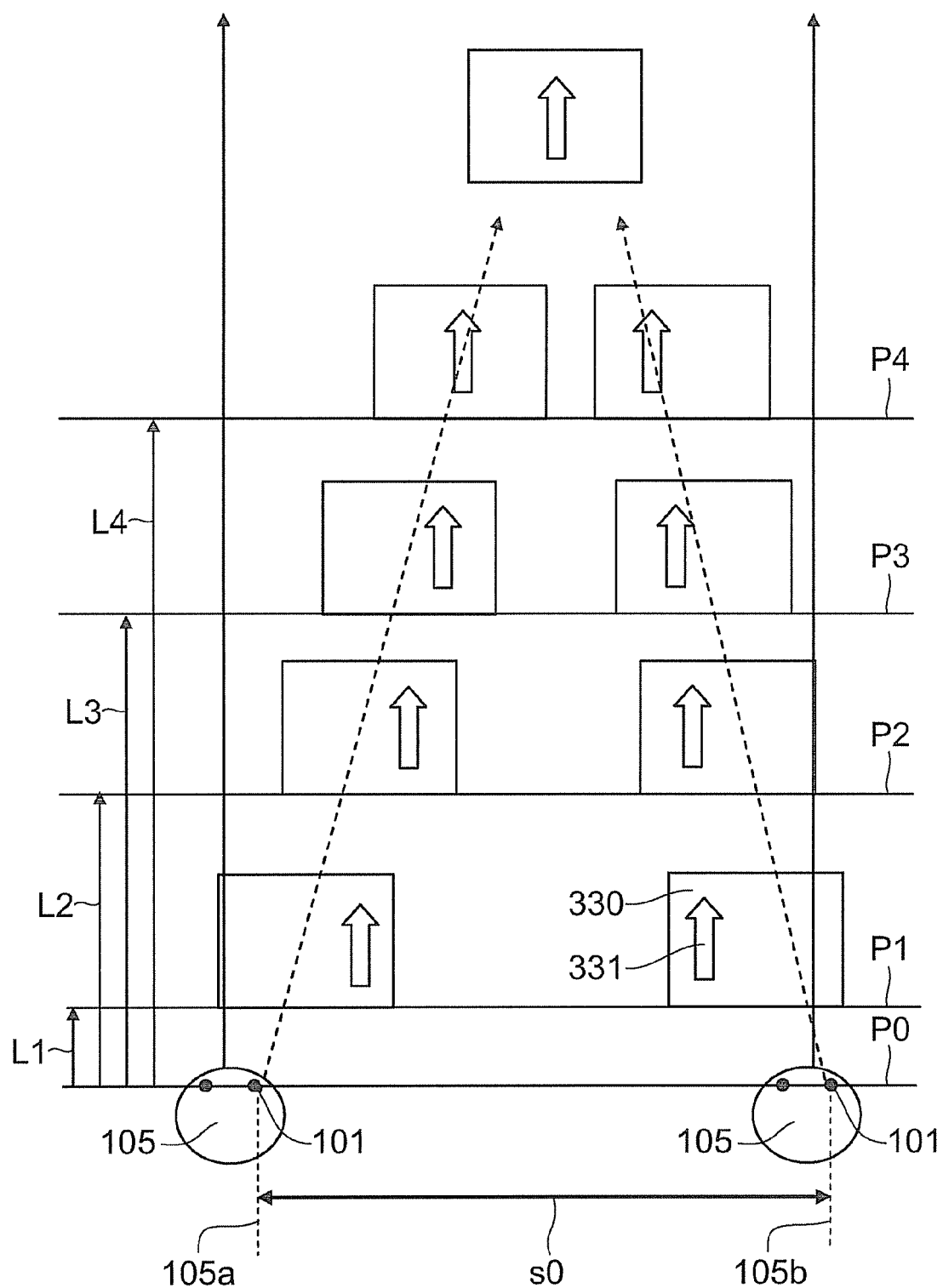
FIG. 6 is a schematic view illustrating the operation of the display apparatus for vehicle according to the first embodiment of the invention.

FIG. 6 is a schematic view illustrating the operation of the display apparatus for vehicle according to the first embodiment of the invention.

The figure schematically illustrates the case of four kinds of target positions for presenting depth of the image by the display apparatus for vehicle 10 according to this embodiment.

As shown in FIG. 6, in the display apparatus for vehicle 10 according to this embodiment, for example, when the depth presenting target position P02 of the image is a position P1 being placed at a distance L1 from the image viewer 100, the position of the display object 331 in the image 330 is displaced by the amount of s1=s0(1−d1/L1) with respect to the moving distance s0 of the one eye 101 of the image viewer 100.

For example, also in the case where the target position for presenting the image is a position P2, P3 and P4 being placed at a distance L2, L3 and L4 from the image viewer 100, similarly, the position of the display object 331 in the image 330 is displaced on the basis of the equation (1).

Thereby, the depth perception position of the presented information can be stably placed at an optional position.

Figure 7:
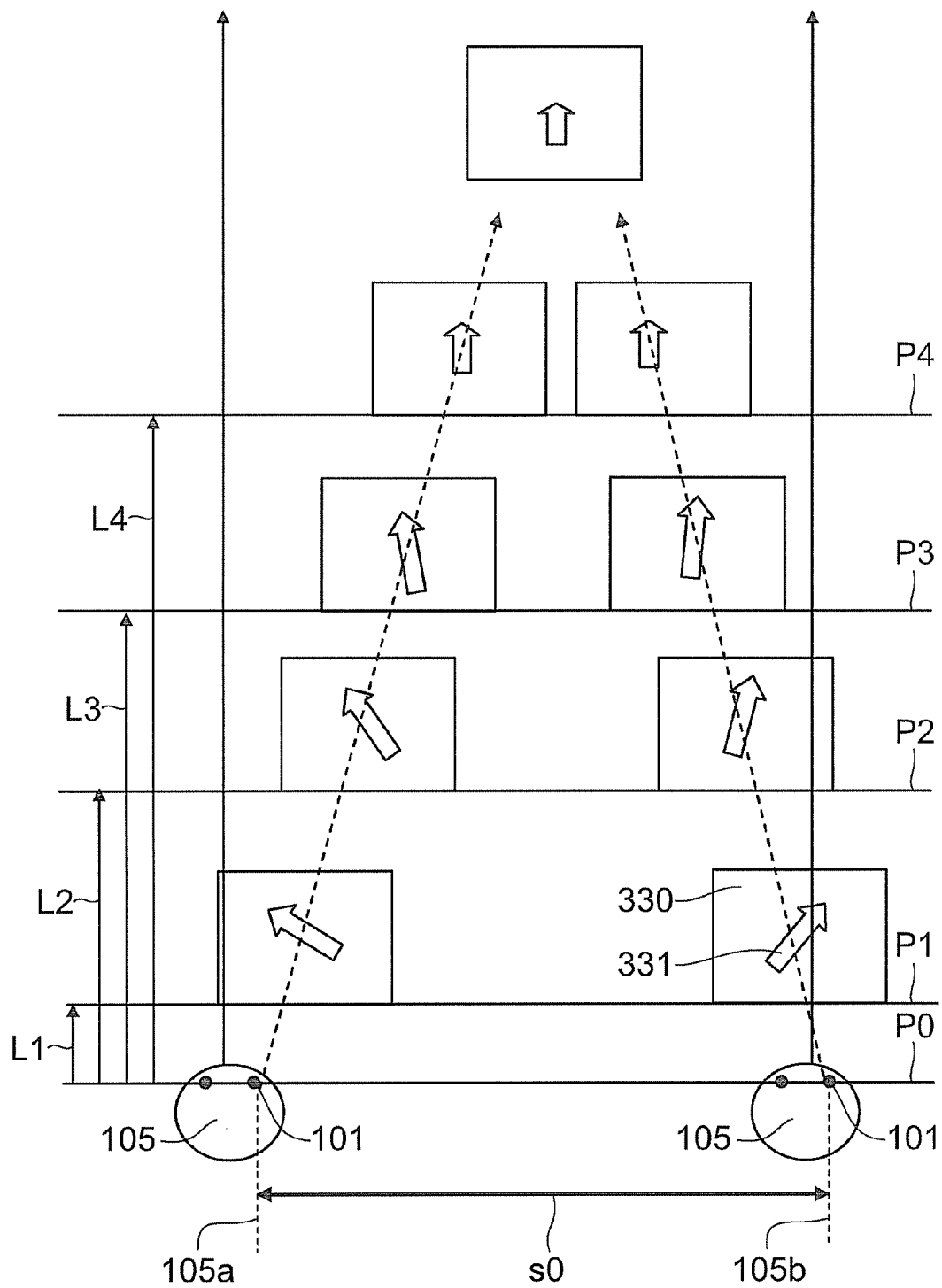
FIG. 7 is a schematic view illustrating another operation of the display apparatus for vehicle according to the first embodiment of the invention.

FIG. 7 is a schematic view illustrating another operation of the display apparatus for vehicle according to the first embodiment of the invention.

The figure schematically illustrates the case of four kinds of target positions for presenting depth of the image by the display apparatus for vehicle 10 according to this embodiment.

As shown in FIG. 7, in the display apparatus for vehicle 10 according to this embodiment, for example, when the depth presenting target position P02 of the image is a position P1 being placed at a distance L1 from the image viewer 100, the shape of the display object is changed on the basis of the distance L1 and the distance s0 with respect to the moving distance s0 of the one eye 101 of the image viewer 100.

For example, also in the case where the target position for presenting the image is a position P2, P3 and P4 being placed at a distance L2, L3 and L4 from the image viewer 100, similarly, the shape of the display object 331 in the image 330 is changed on the basis of the distance L1 and the distance s0.

That is, in the display apparatus for vehicle 10 according to this embodiment, when the distance from the image viewer 100 to the depth presenting target position P02 is assumed to be d2 and the movement distance of the detecting position of the one eye 101 detected is assumed to be s0, the image projector 115 changes the shape of the display object 331 on the basis of the distance d2 and the distance s0.

Specifically, the above angle (angle θ in FIG. 5) is an acute apex angle of a right triangle having a line segment of the distance d4 as an adjacent side and the distance s0 as an opposite side as shown in FIG. 5.

Specifically, the shape of the display object 331 can be changed on the basis of the apex angle θ of the right triangle having the line segment of the distance d2 and the line segment of the distance s0 as the adjacent side and the opposite side illustrated in FIG. 5.

That is, the shape of the display object is deformed on the basis of one of the two acute angles of the right triangular having the distance d2 and the distance s0 as the adjacent side and the opposite side.

For example, the aspect ratio and the angle of arrangement or the like of the display object 331 in the image 330 are changed.

Thereby, the depth perception position of the presented information can be stably placed at an optional position.

Figure 8:
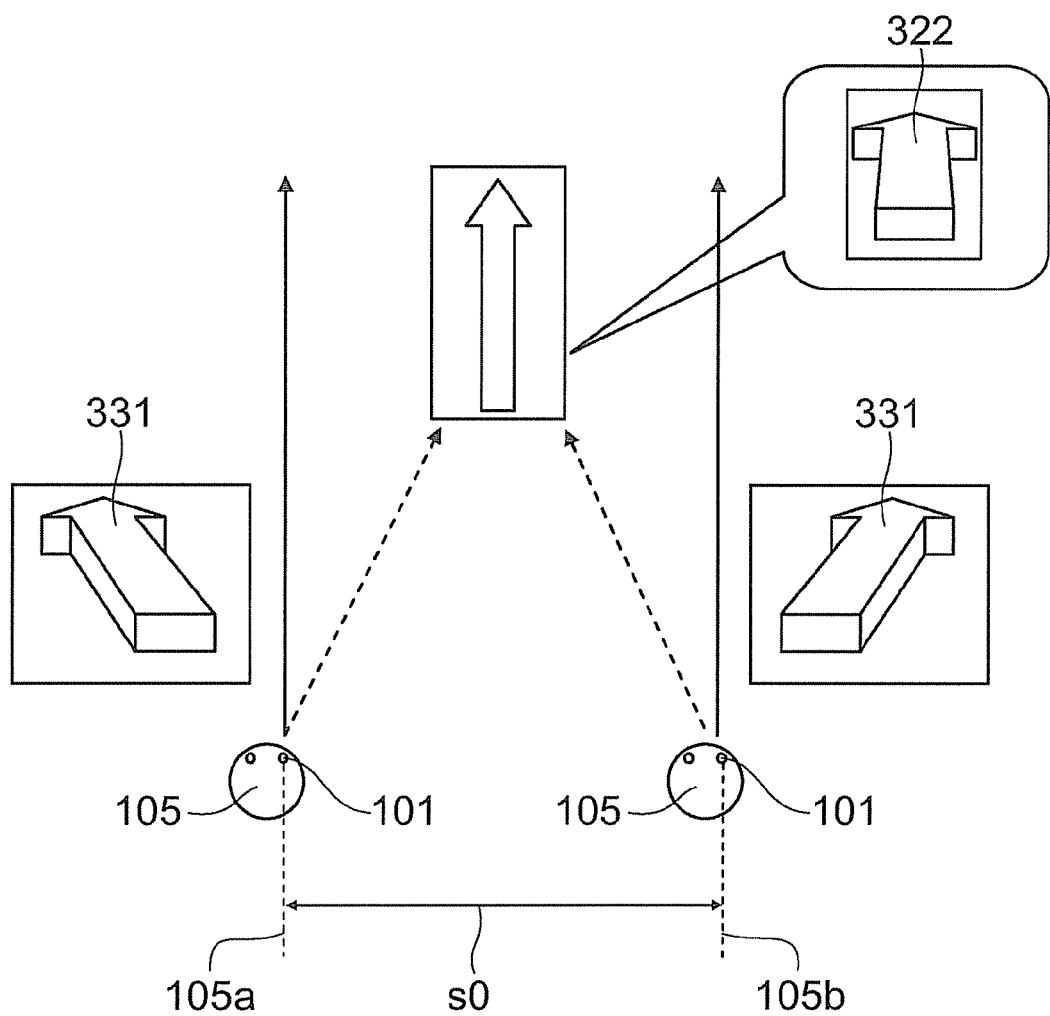
FIG. 8 is a schematic view illustrating another operation of the display apparatus for vehicle according to the first embodiment of the invention.

FIG. 8 is a schematic view illustrating another operation of the display apparatus for vehicle according to the first embodiment of the invention.

That is, the figure illustrates the operation in the case where the image given to the image viewer 100 includes the display object 331 showing an object having a three-dimensional configuration in the display apparatus for vehicle 10 according to this embodiment. In the specific example, a three-dimensional arrow with a thickness is used for the display object 331, for example.

As shown in FIG. 8, in the case of presenting the display object 331 having the three-dimensional configuration, a visual angle seeing the display object 331 changes corresponding to the change of the position of the one eye 101 of the image viewer 100 (visual point position). Accordingly, the shape of the arrow serving as the display object 331 changes three-dimensionally according to the visual point position. The display apparatus for vehicle 10 according to this embodiment deforms the shape of the display object 331 corresponding to the seeing angle. Thus, an object 322 (arrow) to be perceived is perceived by the image viewer 100 on the basis of the depth presenting target position and spatial effect which are desirably set.

The above seeing angle changes with the above distance d2 and the distance s0. For example, the above seeing angle is the angle θ being the acute angle of the right triangle having the line segment of distance d2 and the line segment of the distance s0 as the adjacent side and the opposite side. Then, the shape of the display object 331 is changed on the basis of this angle θ.

Thereby, it becomes possible to give an object perception with a larger spatial effect to the image viewer 100 by giving the image corresponding to the visual angle change based on the movement parallax to the image viewer 100. Thus, it is possible to improve more the accuracy of the subjective depth position.

Figure 9:
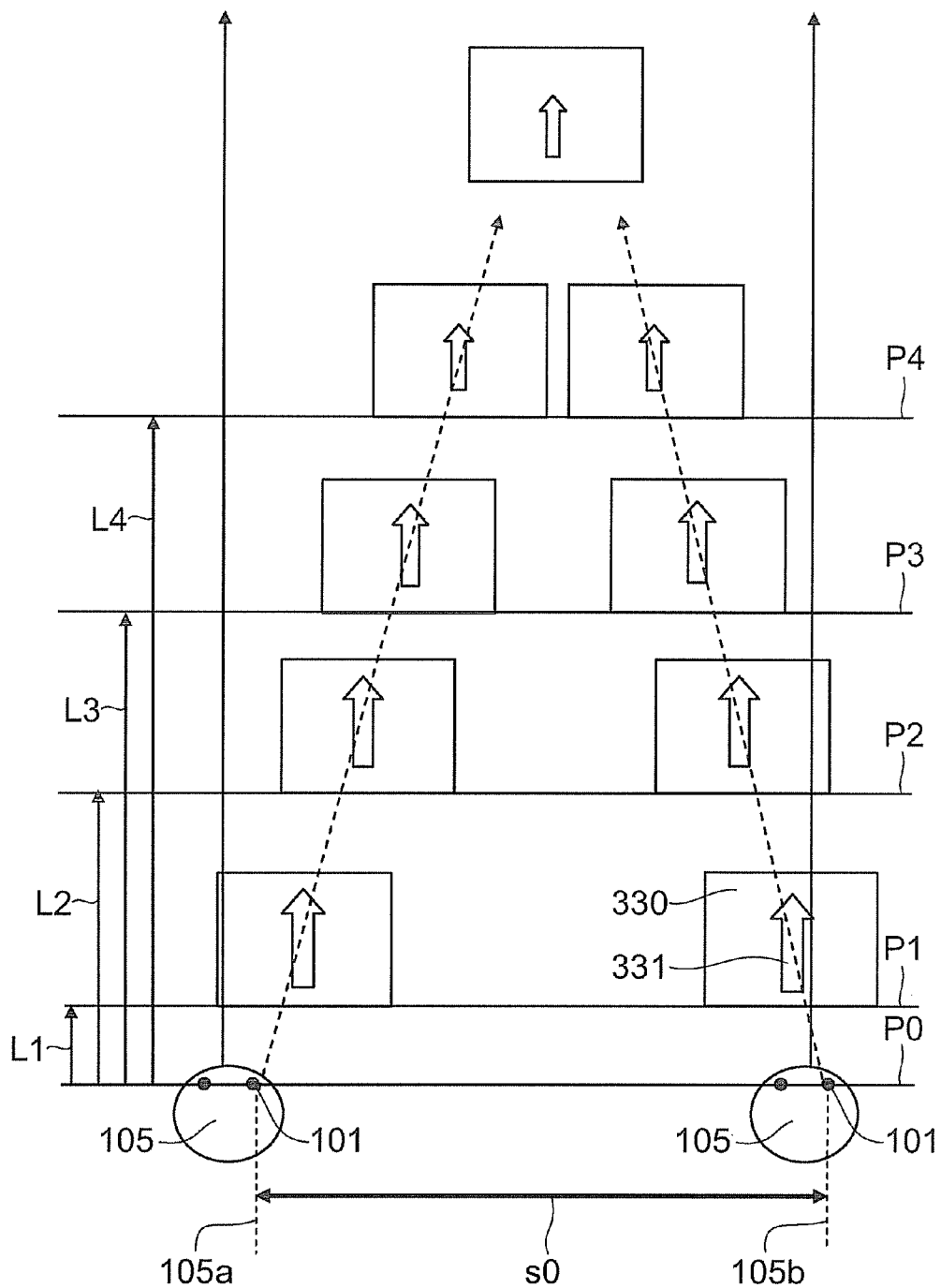
FIG. 9 is a schematic view illustrating another operation of the display apparatus for vehicle according to the first embodiment of the invention.

FIG. 9 is a schematic view illustrating another operation of the display apparatus for vehicle according to the first embodiment of the invention.

The figure schematically illustrates the case of four kinds of target positions for presenting depth of the image by the display apparatus for vehicle 10 according to this embodiment.

As shown in FIG. 9, in the display apparatus for vehicle 10 according to this embodiment, for example, when the depth presenting target position P02 of the image is a position P1 being placed at a distance L1 from the image viewer 100, the size of the display object 331 can be changed on the basis of a distance $d3=(s0^2+L1^2)^{1/2}$ and the distance d2 with respect to the moving distance s0 of the one eye 101 of the image viewer 100. This distance d3 is a length corresponding to a length of an oblique line of the right triangle having the line segment of the distance d2 and the line segment of the distance s0 as the adjacent side and the opposite side.

For example, also in the case where the target position for presenting depth P02 of the image is a position P2, P3 and P4 being placed at a distance L2, L3 and L4 from the image viewer 100, similarly, the size of the display object 331 in the image 330 is changed on the basis of the length of the oblique line of the right triangle having the line segment of the distance d2, the line segment of the distance s0 as the adjacent side and the opposite side, and the distance d2.

That is, in the display apparatus for vehicle 10 according to this embodiment, when the distance from the image viewer 100 to the depth presenting target position P02 is assumed to be d2 and the movement distance of the detecting position of the one eye 101 detected is assumed to be s0, the image projector 115 changes the size of the display object 331 on the basis of the distance $d3=(s0^2+d2^2)^{1/2}$ and the distance d2.

At this time, the size of the display object 331 can be changed on the basis of a ratio of the above distance $d3=(s0^2+d2^2)^{1/2}$ to the distance d2.

This distance d3 and the distance d2 correspond to the oblique line and the adjacent side of the right triangle having the line segment of the distance d2 as the adjacent side and the distance s0 as the opposite side as illustrated in FIG. 5.

Thereby, the depth perception position of the presented information can be stably placed at an optional position.

That is, it becomes possible to decrease individual difference and variations in the localized depth position due to the image viewer, and to localize the subjective depth position of the presented image at an optional position.

When changing the size of the display object 331, the change may be performed on the basis of the movement parallax described above and the distance d2 from the image viewer 100 to the depth presenting target position P02.

Moreover, FIGS. 6 to 9 illustrate independent changes of the position, the shape and the size of the display object 331 in the image 330, however, these changes may be combined optionally.

Thus, in the display apparatus for vehicle 10 according to this embodiment, the depth perception position of the presented information can be placed at an optional position by changing at least one of the position, the shape and the size of the display object 331 in the image 330 on the basis of the moving parallax as described above. This is because the image viewer 100 views the image with the one eye 101.

That is, in the conventional display apparatus for vehicle for viewing with both eyes, namely, HUD, the light flux 112 reflected on the reflector 711 is projected on both eyes of the image viewer. At this time, even if any one of the position, the shape and the size of the display object 331 in the image 330 is changed on the basis of the movement parallax, the depth position sensed subjectively by the image viewer 100 is affected by the position of the virtual image 310 (virtual image formation position 310a) formed by the reflector 711 due to the so called binocular parallax. Therefore, the depth perception position of the presented information is hard to be perceived at a position shifted from the position of the virtual image 310 (virtual image formation position 310a).

That is, for example, as illustrated in FIG. 3, when there are two display objects (first object 341 and second object 342) having different depth in the image, the movement parallax changes arrangement of the image 341a and the image 342a. When this kind of image is viewed with both eyes by the conventional HUD, positions of two objects (first object 341 and second object 342) seem to be shifted, and depth difference between the two objects is hard to be perceived.

On the contrary, in the display apparatus for vehicle 10 according to this embodiment, the image is viewed with one eye 101. Hence, when the image changing the arrangement of the image 341a and the image 342a is viewed by the movement parallax, the depth of two objects is perceived differently. As described with reference to FIG. 4, in a viewing distance from 5 m to approximately 10 m in which the display apparatus for vehicle 10 is used, the sensitivity to the depth perception of the movement parallax is the highest among other factors, hence the display apparatus for vehicle 10 can place the depth perception position of the presented information stably at an optional position highly effectively and efficiently.

As described above, the display apparatus for vehicle 10 can give the depth cue due to the movement parallax by changing at least one of the position, the shape and the size of an display object (display object 331) corresponding to the change of the visual point position in accordance with the head movement, and localize the subjective depth position of the display object.

The above effect of the display apparatus for vehicle 10 according to this embodiment is also confirmed by experiments described below.

Figure 10A:
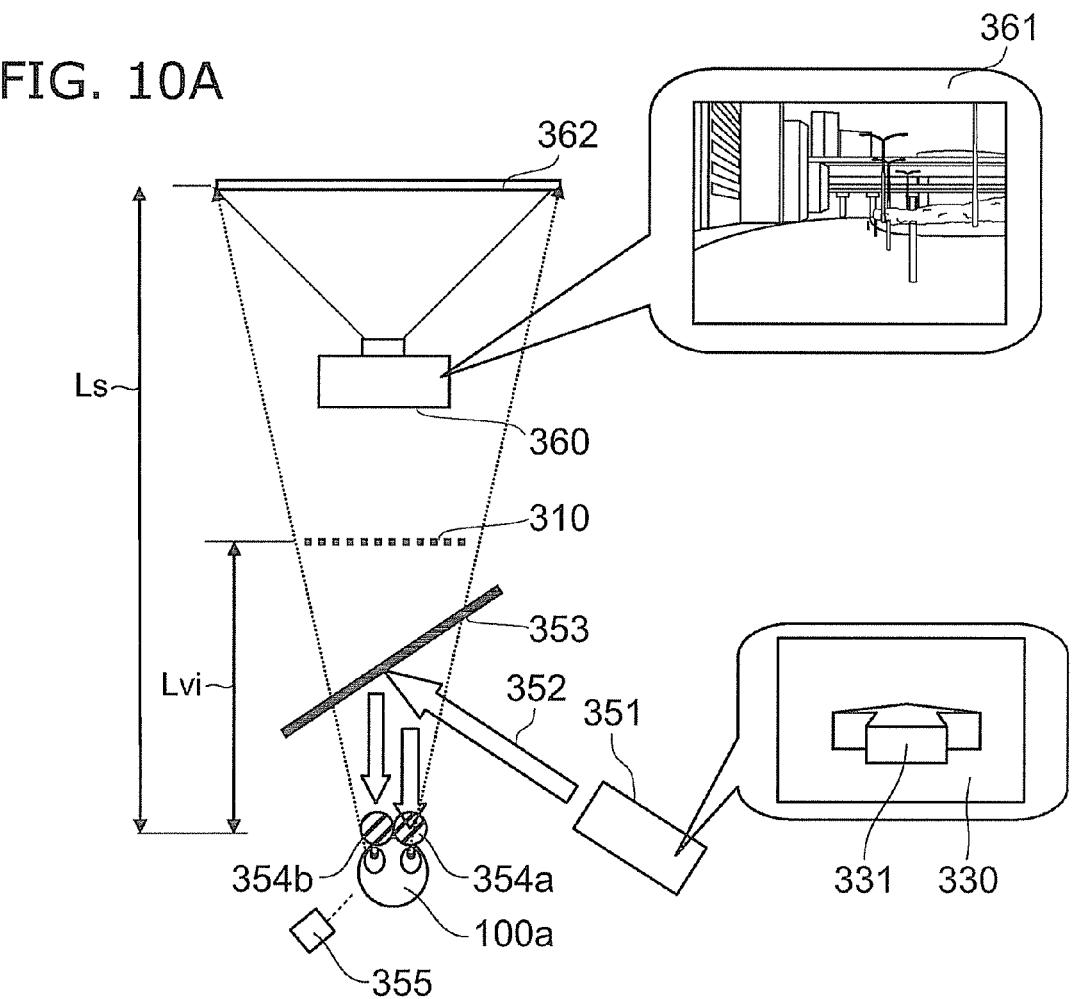
FIGS. 10A and 10B are schematic views illustrating an experimental system on the display apparatus for vehicle according to the first embodiment of the invention.
Figure 10B:
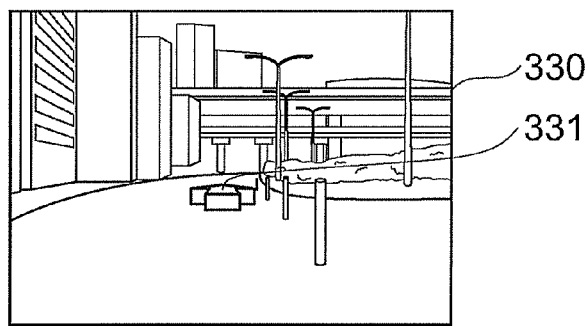

FIGS. 10A and 10B are schematic views illustrating an experimental system on the display apparatus for vehicle according to the first embodiment of the invention.

As shown in FIGS. 10A and 10B, the image is given to a test viewer 100a via a half-mirror 353 in the experimental system regarding the display apparatus for vehicle 10 according to this embodiment. In the projecting the image, an image of "street" projected on a screen 362 is used as a background.

That is, an image 361 which is projected on the screen 362 from a projector 360 is substituted for the outside information (outside scenery) of the moving object. Here, the image 361 is a picture of "street".

On the other hand, a light flux 352 outgoing from an LCD 351 is projected on the test viewer 100a via the half mirror 353. The test viewer 100a observes the image included in the light flux 352 outgoing from the LCD 351 through polarizing filters 354a, 354b with right and left eyes independently.

The light flux 352 outgoing from the LDC 351 is substantially linear polarized light, and thus it becomes possible to present the image only on a dominant eye of the image viewer 100a by setting the polarizing filter 354a associated with the dominant eye in a polarized state parallel to a direction of polarization of the light flux 352 and setting the polarizing filter 354b associated with a non-dominant eye in a polarized state orthogonal to the direction of polarization of the light flux 352. This LCD 351 corresponds to the image projector 115 in the display apparatus for vehicle 10.

A picture displayed by the LCD 351, namely, the display object 331 in the image 330 is taken as "arrow" illustrated in the figure.

The test viewer 100a moves the head from side to side together with the filters 354a, 354b. This head moving distance is detected by a head tracking sensor 355. The head tracking sensor 355 corresponds to the position detector 210 in the display apparatus for vehicle 10.

The position of the display object 331 in the image 330 being displayed on the LCD 351 is moved by the virtual image moving distance s1 corresponding to the depth presenting target position P02 on the basis of the movement parallax due to the head movement detected by the head tracking sensor 355.

In this experimental system, the image including the display object 331 in which the movement parallax is reflected was given to the test viewer 100a in state of single eye view as virtual image stimulation.

The test viewers 100a was requested to make a reply on the subjective depth position P04 of the virtual image stimulation given by the experimental system.

Here, in the above, the experiments were performed assuming that the distance from the test viewer 100a to the half mirror 353 is 0.75 m, the distance from the test viewer 100a to the virtual image formation position 310a (optical virtual image presenting position) is 2.5 m and the distance from the test viewer 100a to the screen 362 (background position) is, two values, 5 m and 7.5 m. Moreover, the experiments were performed with changing a set depth distance d2 (distance from the position of the test viewer 100a to the depth presenting target position P02 of the image) in a range from 15 m to 120 m. Five engineers relating to picture technology served as the test viewers 100a.

Figure 11:
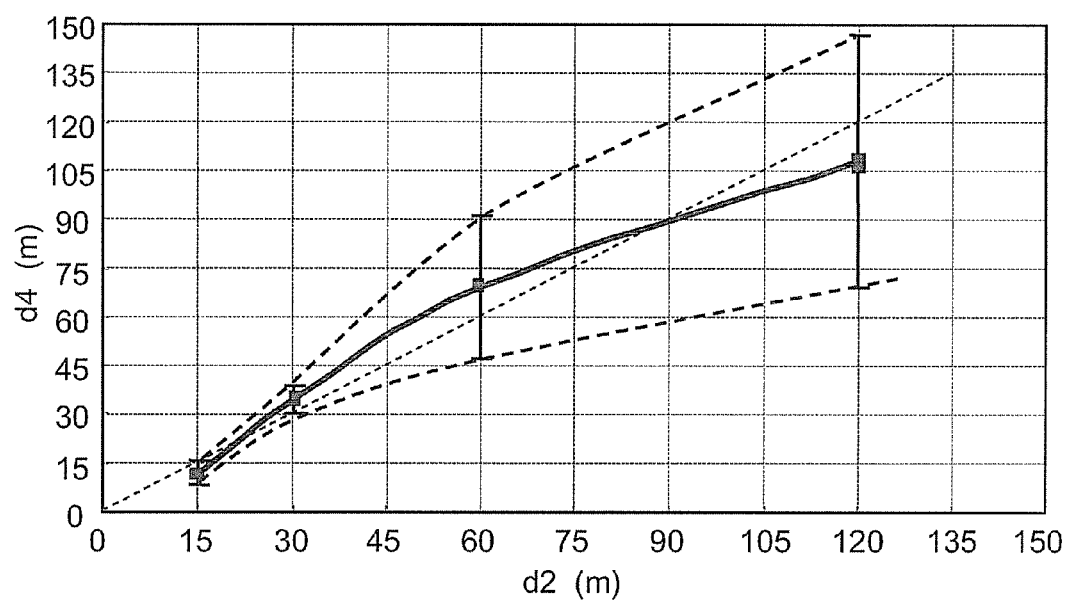
FIG. 11 shows a graph illustrating the experimental results on the display apparatus for vehicle according to the first embodiment of the invention.

FIG. 11 shows a graph illustrating the experimental results on the display apparatus for vehicle according to the first embodiment of the invention.

The horizontal axis of the figure represents the set depth distance d2 (distance from the position of the test viewer 100a to the depth presenting target position P02 of the image), and the vertical axis represents the subjective depth distance d4 (distance from the test viewer 100a to the subjective depth position P04, which is replied by the test viewers 100a).

As shown in FIG. 11, in the experiment in which the display position of the display object 331 is changed based on the movement parallax, the distance d4 to the subjective depth position, which is replied by the test viewers 100a, coincided well with the set depth distance d2. That is, the test viewers 100a perceived the subjective depth distance P04 at a position substantially corresponding to the set depth presenting target position P02.

It is clear from this that the display apparatus for vehicle 10 according to this embodiment gives the subjective depth position P04 corresponding to the set depth presenting target position P02 to the test viewers 100a.

Thus, in the case where only the display position of the display object 331 in the image is changed based on the movement parallax as this experiment, a large effect is obtained as described above, however, furthermore, changing the shape and size of the display object 331 allows the subjective depth position P04 to coincide more precisely with the set optional position.

For comparison, in the above experimental system, observation of the virtual image stimulation by the test viewers 100a was performed in state of both eyes view, however, in this case, the subjective depth position P04 is fixed with a high accuracy at the virtual image position (position of distance d1, 2.5 m, in this experiment), even if the set depth distance d2 is changed in a range from 15 m to 120 m, and thus the subjective depth position P04 could not be changed.

Here, a technique for changing the depth position of a displayed image using a binocular vision has been attempted since a long time ago, however, the both eyes vision needs for a binocular parallax image corresponding to angle of convergence to be incident to left and right eyes independently. Moreover, each binocular parallax image incident to the left and right eyes is dependent on the angle of convergence, and thus it should be changed dynamically corresponding to a direction in which the image viewer views the fixed imaged point.

On the contrary, in the display apparatus for vehicle 10 according to this embodiment, it is possible to give the subjective depth position by controlling the movement of the displayed image located at the virtual image position without dependence on the direction in which the image viewer views the fixed imaged point. This embodiment has the advantage of extremely small amount of image processing in comparison with the binocular vision.

Second Embodiment

A display apparatus for vehicle 20 according to a second embodiment of the invention has the same configuration as that of the display apparatus for vehicle 10 illustrated in FIG. 1, and thus the configuration description is omitted. The display apparatus for vehicle 20 according to this embodiment shows a further advanced operation in addition to the operation of the display apparatus for vehicle 10 of the first embodiment.

Figure 12:
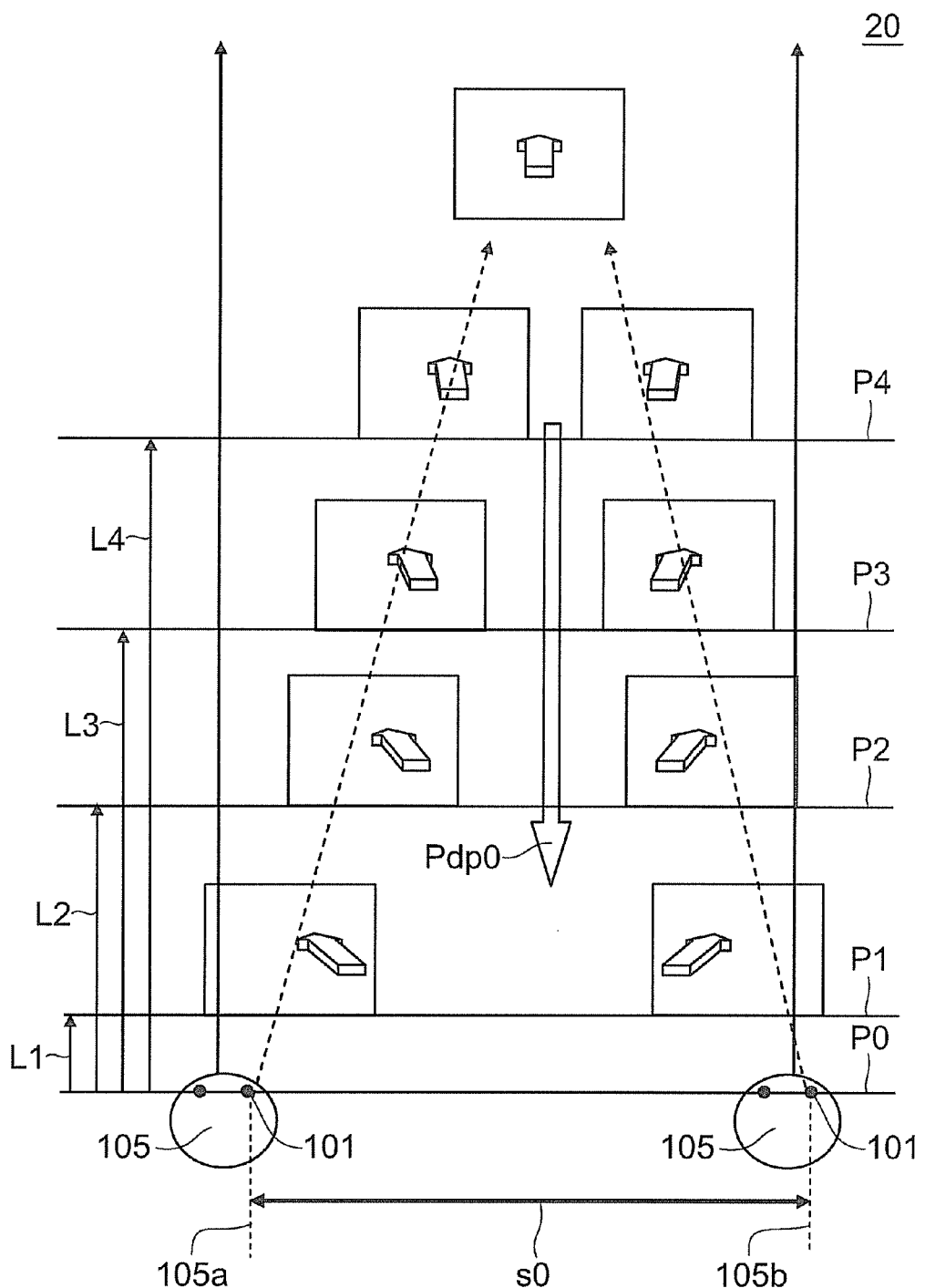
FIG. 12 is a schematic view illustrating the operation of the display apparatus for vehicle according to a second embodiment of the invention.

FIG. 12 is a schematic view illustrating the operation of the display apparatus for vehicle according to the second embodiment of the invention.

As shown in FIG. 12, the depth presenting target position P02 of the image is continuously changed in the display apparatus for vehicle 20 according to the second embodiment of the invention. For example, the depth presenting target position P02 is changed from the position P4 farthest from the image viewer 100 toward the nearest position P1 via the position P3 and the position P2, and may be changed in a reversed direction.

At least one of the position, the shape and the size of the display object 331 in the image 330 is changed simultaneously on the basis of the position of the one eye 101 detected by the position detector 210 in accordance with the continuous change of the depth presenting target position P02.

In the specific example, the position and the shape of the display object 331 in the image 330 are changed simultaneously and continuously.

Thereby, the subjective depth position P04 is interlocked to change corresponding to the continuous change of the depth presenting target position P02. Thus, for example, the depth position of background information changes while the moving object 730 is moving, and interlock with this makes it possible to change the depth presenting target position P02 of the display object 331 and place the subjective depth position P04 at a position interlocked with this.

For example, as illustrated in the figure, when the depth presenting target position P02 is far from the image viewer 100, a difference of the image with respect to the visual angle seeing the display object 331 is small, however, as the depth presenting target position P02 approaches the image viewer 100, the difference of the image with respect to the visual angle seeing the display object 331 increases. This operation allows the subjective depth position P04 to be changed continuously from far to near, or inversely in an optional direction. The depth perception position of the presented information can be placed stably at an optional position.

Third Embodiment

Figure 13:
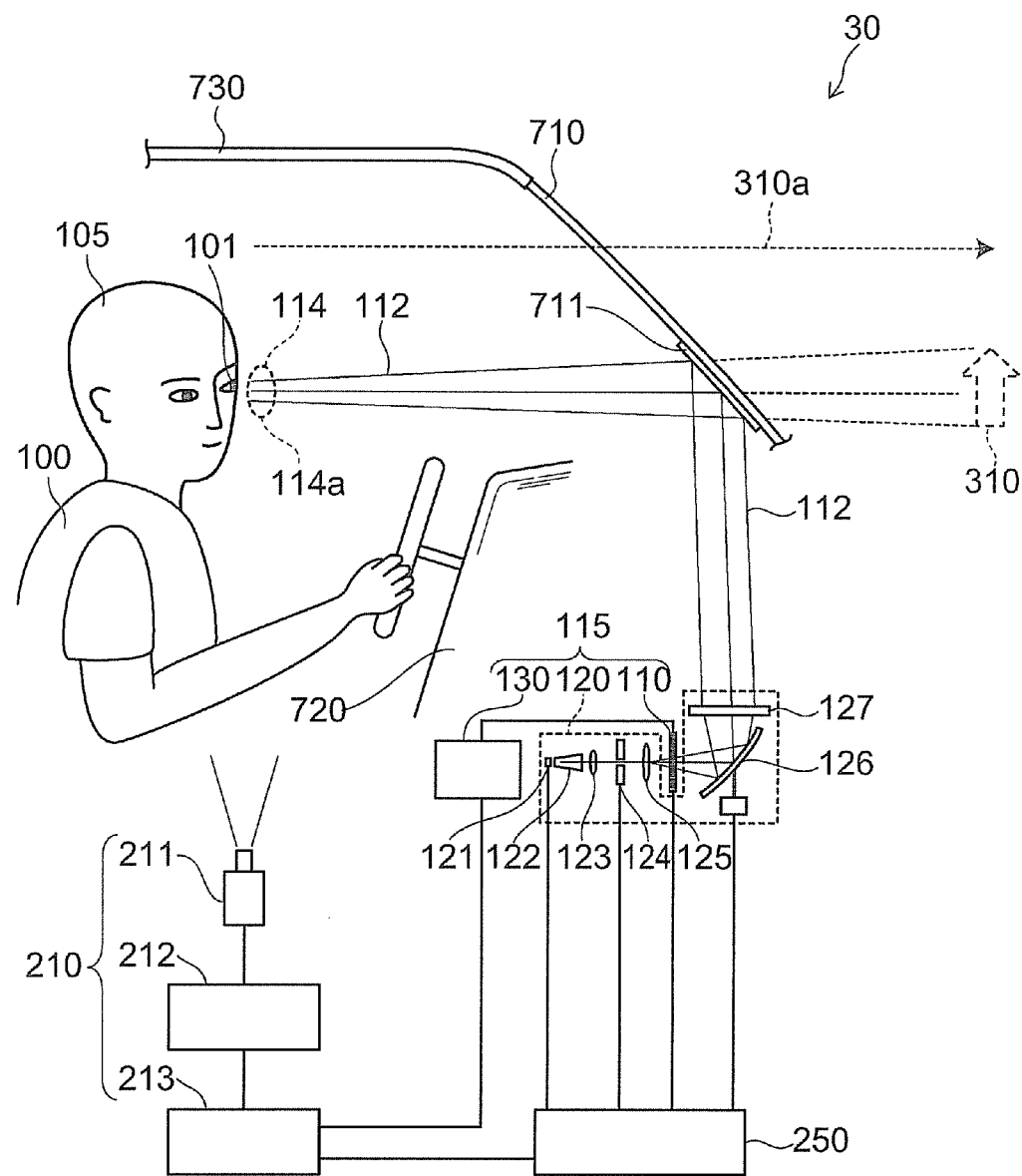
FIG. 13 is a schematic view illustrating the configuration of a display apparatus for vehicle according to a third embodiment of the invention.

FIG. 13 is a schematic view illustrating the configuration of a display apparatus for vehicle according to a third embodiment of the invention.

As shown in FIG. 13, the display apparatus for vehicle 30 according to the third embodiment of the invention further includes a controller 250 configured to adjust at least one of a projected area 114a and a projected position 114 of the light flux 112 by controlling the image projector 115 on the basis of the position of the one eye 101 of the image viewer 100 detected by the position detector 210 in addition to the configuration of the display apparatuses for vehicle 10, 20 according to the first and second embodiments.

In the specific example, the controller 250 illustratively controls the projected position 114 by controlling a driving section 126a connected to the mirror 126 forming part of the projector 120 to control the angle of the mirror 126.

The controller 250 can illustratively control the projected area 114a by controlling the light source 121 and the variable aperture 124 or the like.

Thereby, even if the head 105 of the image viewer 100 moves, it becomes possible to follow it to control the presented position of the image. It becomes free of misalignment from the image presenting position due to the head movement of the image viewer 100 and a practical view range can be enlarged with increase of the user friendliness.

The display apparatus for vehicle 30 according to this embodiment can stably place the depth perception position of the presented information at an optional position and provide a display apparatus for vehicle with further user friendliness.

The controller 250 may illustratively adjust brightness and contrast or the like of the image by controlling the light source 121, the variable aperture 124 and the image forming section 110.

Figure 14:
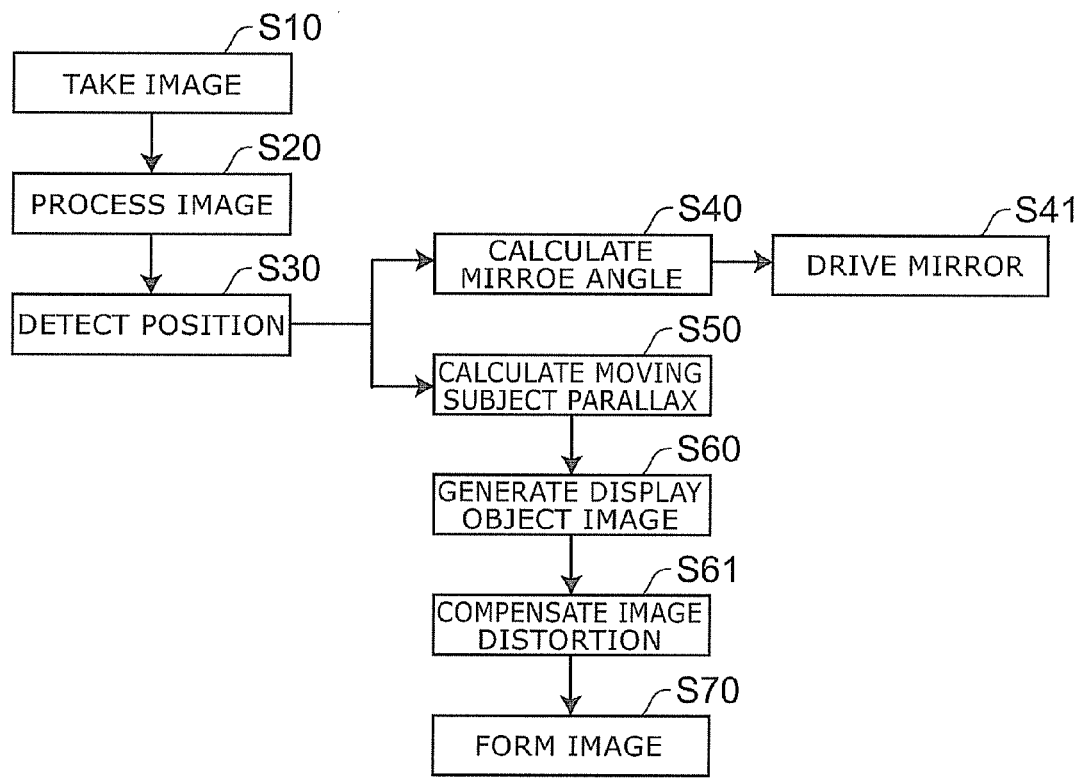
FIG. 14 is a block diagram illustrating the operation of the display apparatus for vehicle according to the third embodiment of the invention.

FIG. 14 is a block diagram illustrating the operation of the display apparatus for vehicle according to the third embodiment of the invention.

As shown in FIG. 14, the image viewer 100 is taken using the image taking section 211 (step S10). The face recognition of the image viewer 100 and its image processing are performed by the image processing section 212 from its picture (step S20). The position of the one eye 101 of the image viewer 100 is detected using the calculating section 213 from the result (step S30).

The angle of the mirror 126 is calculated using the calculating section 213 from the position of the one eye 101 detected (step S40). The controller 250 controls the driving section 126a on the basis of the calculated angle and the driving section 126a controls the mirror 126 to be at a prescribed angle (step S41).

On the other hand, the calculating section 213 calculates the moving subject parallax on the basis of the position of the one eye 101 detected (step S50). The image generating section 130 deforms the display object 331 on the basis of the moving subject parallax to generate the image data including the display object 331 (step S60). An image distortion is compensated as needed (step S61). Its data image signal is supplied to the image forming section 110 and the image is formed (step S70). For example, the light flux generated by the projector 120 is incident on the image forming section 110, and the light flux 112 including the image is incident on the one eye 101 of the image viewer 100.

As described above, while the display apparatus for vehicle 30 according to this embodiment adjusts at least one of the projected area 114a and the projected position 114 of the light flux 112, the apparatus changes at least one of the position, the shape and the size of the display object 331 in the image 330 on the basis of the movement parallax of the image viewer 100. Thus, the depth perception position of the presented information can be stably placed at an optional position, and a display apparatus for vehicle with further user friendliness can be provided.

Fourth Embodiment

Figure 15:
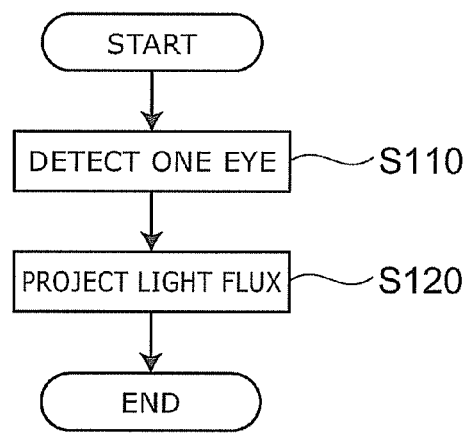
FIG. 15 shows a flow chart illustrating a display method according to a fourth embodiment of the invention.

FIG. 15 shows a flow chart illustrating a display method according to a fourth embodiment of the invention.

As shown in FIG. 15, in the display method according to the fourth embodiment of the invention, first, the position of the one eye 101 of the image viewer 100 is detected (step S110). This can be performed based on the position detector 210 illustrated in FIG. 1.

The light flux 112 including the image having the display object 331 is projected toward the one eye 101 of the image viewer 100 by changing at least one of the position, the shape and the size of the display object 331 in the image 330 on the basis of the position of the one eye 101 detected (step S120). This can be performed based on the image projector 115 illustrated in FIG. 1.

At this time, as described previously, at least one of the position, the shape and the size of the display object 331 in the image 330 can be changed on the basis of the moving subject parallax calculated from the position of the one eye 101 detected.

Thereby, a display method allowing the depth perception position of the presented information to be stably placed at an optional position can be provided.

In the display method according to this embodiment, at least one of the position, the shape and the size of the display object 331 in the image 330 can be changed on the basis of the moving subject parallax and the depth presenting target position P02 of the image. Thereby, the subjective depth position P04 can be placed at the optional depth presenting target position P02.

Furthermore, while the depth presenting target position P02 is continuously changed, at least one of the position, the shape and the size of the display object 331 in the image 330 can be changed on the basis of the moving subject parallax and the depth presenting target position P02 of the image.

As described above, the embodiments of the invention have been described with reference to specific examples. However, the invention is not limited to these specific examples. For instance, any specific configurations of the components constituting the display apparatus for vehicle and the display method are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible, and such combinations are also encompassed within the scope of the invention as long as they fall within the spirit of the invention.

Furthermore, those skilled in the art can suitably modify and implement the display apparatus for vehicle and the display method described above in the embodiments of the invention, and any display apparatus and the display method thus modified are also encompassed within the scope of the invention as long as they fall within the spirit of the invention.

Furthermore, those skilled in the art can conceive various modifications and variations within the spirit of the invention, and it is understood that such modifications and variations are also encompassed within the scope of the invention.

The invention claimed is:

1. A display apparatus for vehicle comprising:
   an image projector configured to project a light flux including an image having a display object toward a one eye of an image viewer; and
   a position detector configured to detect the one eye of the image viewer,
   the image projector being configured to change a shape of the display object in the image on the basis of a position of the one eye detected by the position detector, moving subject parallax of the image viewer calculated from the position of the one eye detected by the position detector, and a depth presenting target position of the image, wherein
   when a distance from the image viewer to the depth presenting target position is assumed to be d2, and a movement distance of a detecting position of the one eye detected is assumed to be s0, the image projector changes the shape of the display object on the basis of one of two acute angles of a right triangle having a line segment of the d2 and a line segment of the s0 as an adjacent side and an opposite side.

2. The apparatus according to claim 1, wherein the image projector changes the shape of the display object in the image continuously on the basis of the one of two acute angles, while changing the depth presenting target position continuously.

3. The apparatus according to claim 1, wherein the image projector makes the image viewer view the image via a reflector which reflects the light flux to projects the light flux toward the one eye of the image viewer.

4. The apparatus according to claim 1, further comprising a controller configured to adjust at least one of a projected area and a projected position of the light flux by controlling an optical device including at least one of a mirror, a light source and aperture included in the image projector on the basis of the position of the one eye detected.

5. A display apparatus for vehicle comprising:
an image projector configured to project a light flux including an image having a display object toward a one eye of an image viewer; and
a position detector configured to detect the one eye of the image viewer,
the image projector being configured to change a size of the display object in the image on the basis of a position of the one eye detected by the position detector, moving subject parallax of the image viewer calculated from the position of the one eye detected by the position detector, and a depth presenting target position of the image, wherein
when a distance from the image viewer to the depth presenting target position is assumed to be d2, and a movement distance of a detecting position of the one eye detected is assumed to be s0, the image projector changes the size of the display object on the basis of a distance $d3=(s0^2+d2^2)^{1/2}$ and on the basis of the d2.

6. The apparatus according to claim 5, wherein the image projector changes the size of the display object in the image continuously on the basis of the distance d3 and on the basis of the d2, while changing the depth presenting target position continuously.

7. The apparatus according to claim 5, wherein the image projector makes the image viewer view the image via a reflector which reflects the light flux to projects the light flux toward the one eye of the image viewer.

8. The apparatus according to claim 5, further comprising a controller configured to adjust at least one of a projected area and a projected position of the light flux by controlling an optical device including at least one of a mirror, a light source and aperture included in the image projector on the basis of the position of the one eye detected.

9. A display apparatus for vehicle comprising:
an image projector configured to project a light flux including an image having a display object toward a one eye of an image viewer; and
a position detector configured to detect the one eye of the image viewer,
the image projector changing a position of the display object in the image on the basis of a position of the one eye detected by the position detector, moving subject parallax of the image viewer calculated from the position of the one eye detected by the position detector, and a depth presenting target position of the image,
the image projector makes the image viewer view the image via a reflector which reflects the light flux to projects the light flux toward the one eye of the image viewer, wherein
when a distance from the image viewer to a position of a virtual image of the image formed by the reflector is assumed to be d1, a distance from the image viewer to the depth presenting target position of the image is assumed to be d2, and a movement distance of a detecting position of the one eye detected is assumed to be s0, the image projector changes the position of the display object in the image by a distance $s1=s0(1-d1/d2)$.

10. The apparatus according to claim 9, wherein the image projector changes the position of the display object in the image continuously on the basis of the s1, while changing the depth presenting depth presenting target position continuously.

11. The apparatus according to claim 9, further comprising a controller configured to adjust at least one of a projected area and a projected position of the light flux by controlling an optical device including at least one of a mirror, a light source and aperture included in the image projector on the basis of the position of the one eye detected.

12. A display method comprising:
detecting a position of a one eye of an image viewer; and
changing a shape of a display object in an image on the basis of the position of the one eye detected, moving subject parallax of the image viewer calculated from the position of the one eye detected and a depth presenting target position of the image to project a light flux including the image toward the one eye of the image viewer, wherein
when a distance from the image viewer to the depth presenting target position is assumed to be d2, and a movement distance of a detecting position of the one eye detected is assumed to be s0, the changing the shape includes changing the shape of the display object on the basis of one of two acute angles of a right triangle having a line segment of the d2 and a line segment of the s0 as an adjacent side and an opposite side.

13. The method according to claim 12, further adjusting at least one of a projected area and a projected position of the light flux by controlling an optical device including at least one of a mirror, a light source and aperture included in the image projector on the basis of the position of the one eye detected.

14. A display method comprising:
detecting a position of a one eye of an image viewer; and
changing a size of a display object in an image on the basis of the position of the one eye detected, moving subject parallax of the image viewer calculated from the position of the one eye detected and a depth presenting target position of the image to project a light flux including the image toward the one eye of the image viewer, wherein
when a distance from the image viewer to the depth presenting target position is assumed to be d2, and a movement distance of a detecting position of the one eye detected is assumed to be s0, the changing the size includes changing the size of the display object on the basis of a distance $d3=(s0^2+d2^2)^{1/2}$ and on the basis of the d2.

15. The method according to claim 14, further adjusting at least one of a projected area and a projected position of the light flux by controlling an optical device including at least one of a mirror, a light source and aperture included in the image projector on the basis of the position of the one eye detected.

16. A display method comprising:
detecting a position of a one eye of an image viewer; and
changing a position of a display object in an image on the basis of the position of the one eye detected moving subject parallax of the image viewer calculated from the position of the one eye detected and a depth presenting target position of the image to project a light flux including the image toward the one eye of the image viewer, the projecting the light flux includes making the image viewer view the image via a reflector which reflects the light flux to projects the light flux toward the one eye of the image viewer, wherein when a distance from the image viewer to a position of a virtual image of the image formed by the reflector is assumed to be d1, a distance from the image viewer to the depth presenting target position of the image is assumed to be d2, and a movement distance of a detecting position of the one eye detected is assumed to be s0, the changing includes changing the position of the display object in the image by a distance $s1=s0(1-d1/d2)$.

17. The method according to claim 16, further adjusting at least one of a projected area and a projected position of the light flux by controlling an optical device including at least one of a mirror, a light source and aperture included in the image projector on the basis of the position of the one eye detected.

* * * * *